United States Patent
Wrobel

(10) Patent No.: US 7,152,926 B2
(45) Date of Patent: Dec. 26, 2006

(54) LOCKING DEVICE FOR A VEHICLE SEAT

(75) Inventor: Darius Wrobel, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/401,601

(22) Filed: Apr. 11, 2006

(65) Prior Publication Data

US 2006/0181087 A1 Aug. 17, 2006

Related U.S. Application Data

(63) Continuation of application No. PCT/EP04/011581, filed on Oct. 15, 2004.

(30) Foreign Application Priority Data

Oct. 17, 2003 (DE) ................................ 103 48 451

(51) Int. Cl.
*B60N 2/015* (2006.01)

(52) U.S. Cl. ............................ 297/378.13; 296/65.03; 296/65.17

(58) Field of Classification Search ................ 297/331, 297/336, 378.13; 296/65.03, 65.05, 65.09, 296/65.17, 65.18
See application file for complete search history.

(56) References Cited

U.S. PATENT DOCUMENTS

| | | | | |
|---|---|---|---|---|
| 4,765,682 A | * | 8/1988 | Satoh | 297/378.13 |
| 5,730,480 A | * | 3/1998 | Takamura | 297/326 |
| 5,762,401 A | | 6/1998 | Bernard | |
| 5,904,403 A | * | 5/1999 | Unckrich | 297/378.12 |
| 6,629,710 B1 | * | 10/2003 | Shafry et al. | 292/216 |
| 6,715,841 B1 | * | 4/2004 | Christoffel et al. | 297/335 |
| 6,733,078 B1 | * | 5/2004 | Zelmanov | 296/65.16 |
| 6,786,551 B1 | * | 9/2004 | Brewer et al. | 297/378.13 |
| 6,902,237 B1 | * | 6/2005 | Petry | 297/344.15 |
| 2004/0007909 A1 | * | 1/2004 | Bonk | 297/378.13 |

FOREIGN PATENT DOCUMENTS

| | | |
|---|---|---|
| DE | 35 10 006 C1 | 6/1986 |
| DE | 40 26 519 A1 | 3/1991 |
| DE | 195 22 721 A1 | 1/1996 |
| DE | 44 44 122 C1 | 4/1996 |
| DE | 102 02 344 A1 | 4/2003 |
| DE | 101 56 200 A1 | 6/2003 |
| EP | 0 125 978 A2 | 11/1984 |
| EP | 0 952 288 A1 | 10/1999 |
| EP | 1 203 689 A1 | 5/2002 |
| FR | 2 803 562 A1 | 7/2001 |
| FR | 2 828 148 A1 | 2/2003 |
| FR | 2 828 149 A1 | 2/2003 |

\* cited by examiner

*Primary Examiner*—Peter R. Brown
(74) *Attorney, Agent, or Firm*—Womble Carlyle Sandridge & Rice, PLLC

(57) ABSTRACT

In a locking device (1) for a vehicle seat (5), particularly for a motor vehicle seat, having locking elements (21, G) which interact in order to lock the locking device (1) and are moved away from one another to unlock it, and at least one securing element (15, 17) which ensures that the locked locking elements (21, G) do not open, the securing element (15, 17) being moved away from the locking elements (21, G) in order to unlock the locking device (1), a blocking element (25) is provided which blocks the securing element (15, 17), which has been moved away, as long as the locking elements (21, G) are not moved away from one another.

20 Claims, 6 Drawing Sheets

LOCKING DEVICE FOR A VEHICLE SEAT

CROSS-REFERENCE TO RELATED APPLICATION

The present application is a continuation of International Application PCT/EP2004/011581, which was filed Oct. 15, 2004. The entire disclosure of International Application PCT/EP2004/011581 is incorporated herein by reference.

BACKGROUND OF THE INVENTION

The present invention relates to a locking device for a vehicle seat, with the locking device having locking elements that interact in order to lock the locking device and are moved away from one another to unlock it, and a securing element that, on the one hand, ensures that the locked locking elements do not move away from one another, and, on the other hand, is moved away from the locking elements in order to unlock the locking device.

Using a known locking device of the type described immediately above, a pivotable backrest of a rear seat is detachably locked to the vehicle structure. One of the locking elements is formed as a bolt or bracket, and the other locking element is formed as a pawl. The locking elements are arranged, together with the other components of the locking device, in a lock. If the securing element is moved away from the locking elements in order to allow unlocking, the locking elements must be moved away from one another, that is to say, the lock must be pivoted away from the bolt or bracket or vice versa while the securing element is held open. If the securing element is released and the weight of the backrest, for example, prevents automatic pivoting and discharge of the bolt or bracket from the lock, the locking device could unintentionally lock again.

BRIEF SUMMARY OF SOME ASPECTS OF THE INVENTION

An aspect of the present invention is the provision of improvements to a locking device of the type described above. In accordance with one aspect of the present invention, a locking device for a vehicle seat, particularly for a motor vehicle seat, includes locking elements, at least one securing element, and a blocking element. The locking elements interact in order to lock the locking device. On the other hand, the locking elements are moved away from one another to unlock the locking device. More generally, at least one of the locking elements is moved away from another of the locking elements to unlock the locking device. The securing element ensures that the locked locking elements do not open. The securing element is moved away from the locking elements in order to unlock the locking device. The blocking element blocks the securing element, which has been moved away, as long as the locking elements are not moved away from one another.

As a result of the securing element, which has been moved away, being blocked by the blocking element so long as the locking elements are not moved away from one another, the securing element is prevented from returning to its original position after it has been released, so that opening of the locking elements is not prevented. That is, with the activation of the blocking element according to the invention, the locking elements can be moved away from one another unhindered. If two securing elements are provided, for example one for normal circumstances and one for the event of a crash, the dominant securing element for the unlocking process, generally that for the event of a crash, is blocked by the blocking element.

The securing element is preferably pivotably mounted on a first bearing bolt and pivotable beyond an angle necessary for opening the locking elements, in order to have available a certain angle region for the activation of the blocking element. The blocking element is, for example, pivotably mounted on the securing element in order to be able to pivot out when activated and to be supported on a locking element or on a bearing bolt of the locking element. It is likewise possible that the blocking element is pivotably mounted in some other way and, when activated, pivots out in such a way that it is supported on the securing element.

A pawl and a mating element are preferably provided as the locking elements. The pawl is pivotably mounted on a second bearing bolt. The mating element is removable from the other components of the locking device. The other components of the locking device, which the mating element is removable from, form a unit. The blocking element moves with the securing element and preferably slides along the second bearing bolt during the pivoting of the securing element. At an angle of the securing element which is greater than that necessary for opening the locking elements, the blocking element is preferably supported flatly on the second bearing bolt, in order to block the securing element.

In order to deactivate this block again, the opening pawl preferably takes along the blocking element, for example by means of a laterally protruding driver. At a certain pivot angle of the pawl, at which the pivoting movement of the pawl has advanced to the point where the securing element can no longer cause a reversal of the pivoting movement and the mating element can already be moved away, the preload of the securing element is preferably greater than the self-locking force of the blocking element on the second bearing bolt. As a result, the blocking element can pivot in and unblock the securing element. The unblocked securing element then preferably pivots back, for example to the angle necessary for opening the locking elements, and preferably rests against the pawl.

The locking device according to the invention can be used in a vehicle seat, for example for a lock which locks a pivotable backrest of the vehicle seat to the vehicle structure. Such a lock having the locking device according to the invention can also be used for fastening the vehicle seat to the base of the vehicle. The locking device according to the invention can, however, also be made use of in other fittings of the vehicle seat.

BRIEF DESCRIPTION OF THE DRAWINGS

The invention is described in more detail in the following text on the basis of an exemplary embodiment illustrated in the drawings, in which.

DETAILED DESCRIPTION OF EXEMPLARY EMBODIMENT

Figure 1:
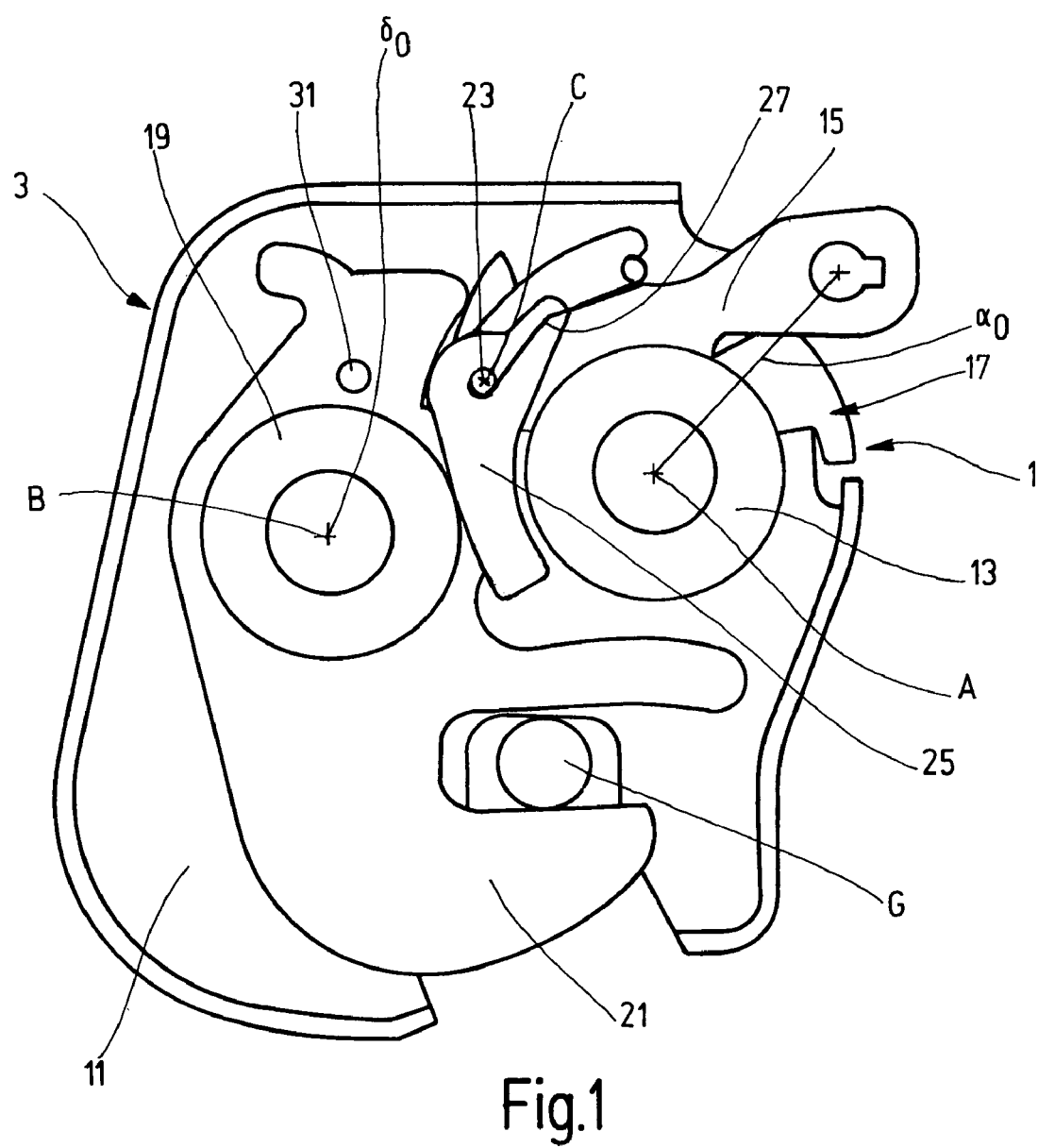
FIG. 1 shows a partially sectioned view of the exemplary embodiment in the locked position.
Figure 2:
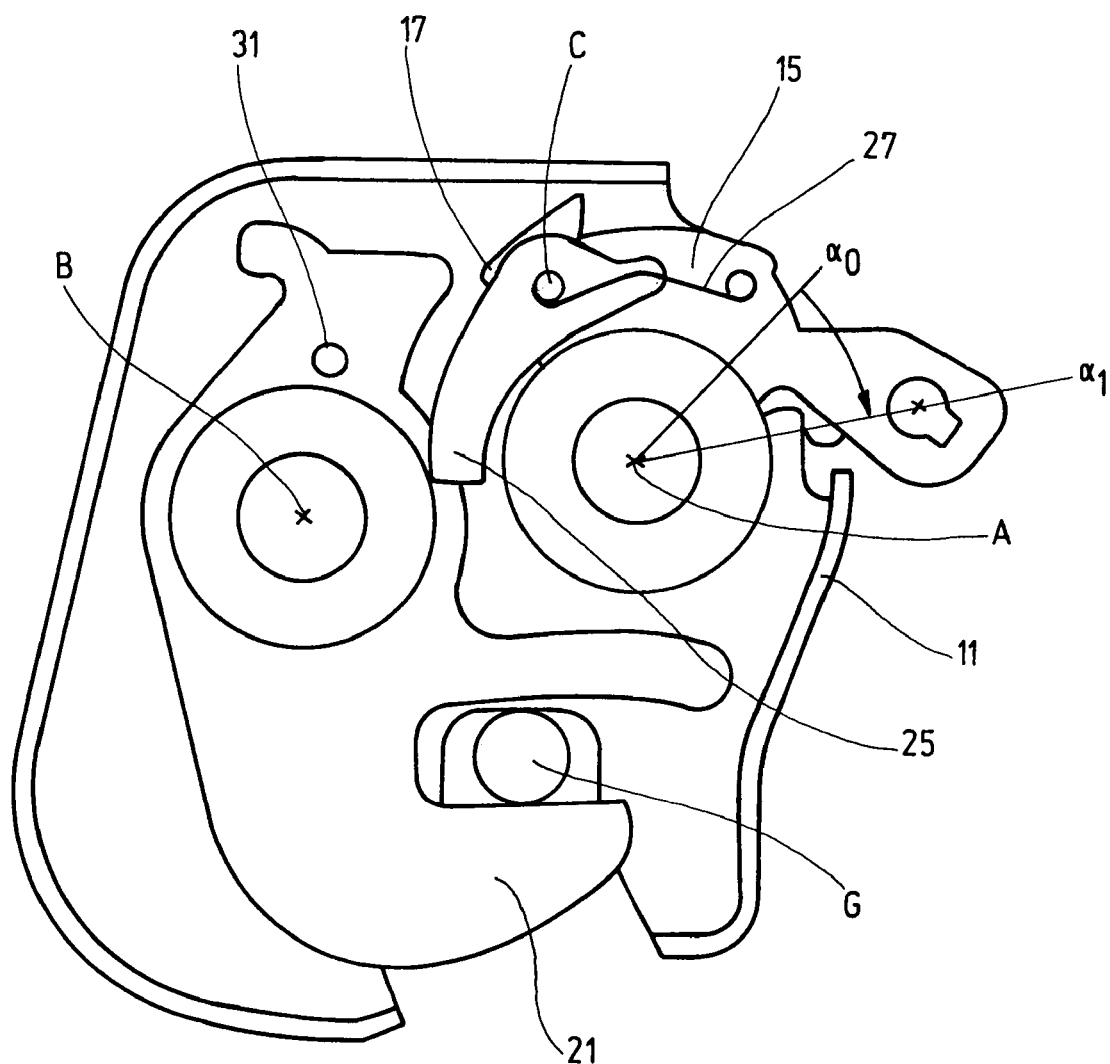
FIG. 2 shows a corresponding view with a catch piece pivoted up.
Figure 3:
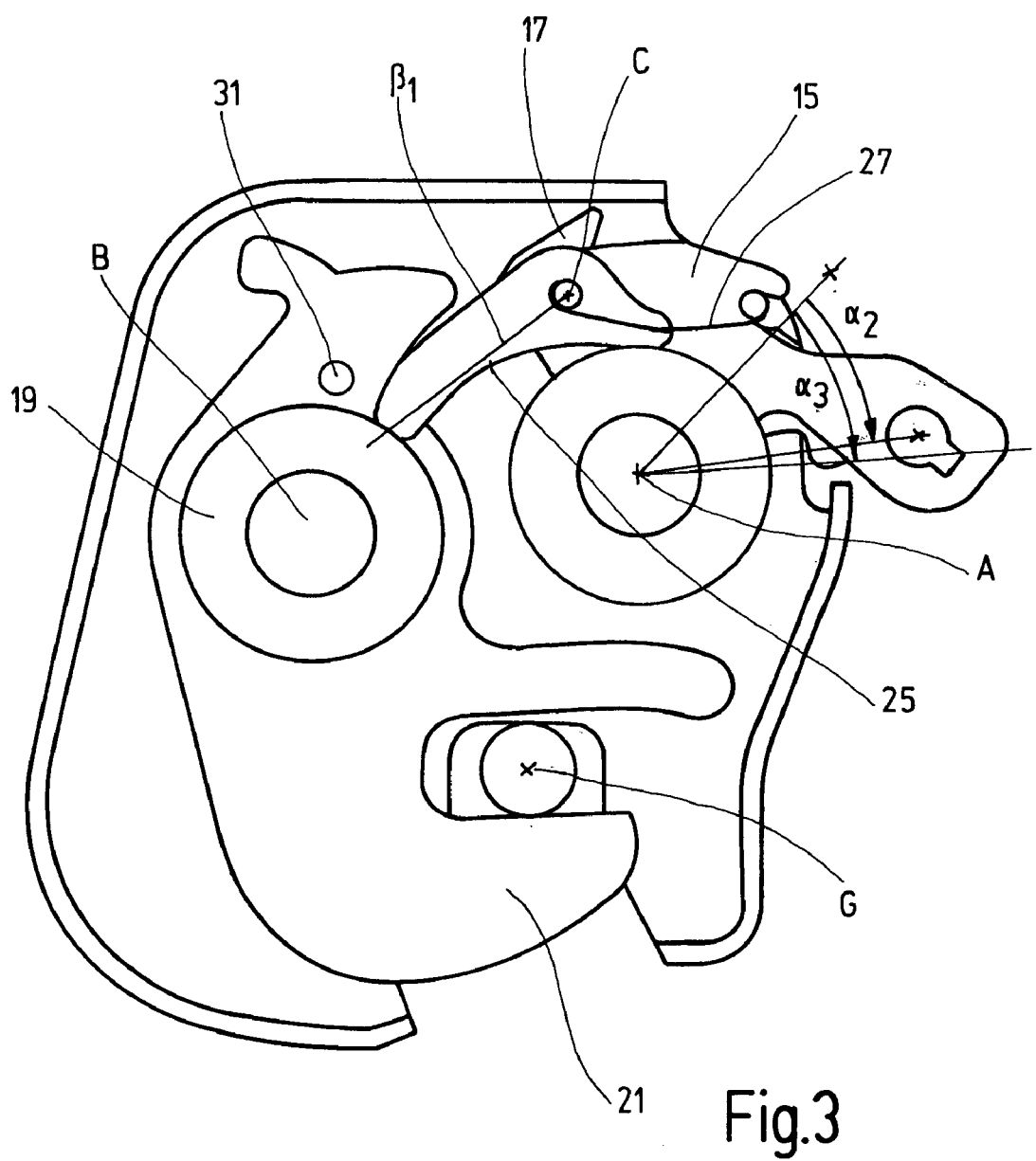
FIG. 3 shows a corresponding view with the block activated.
Figure 4:
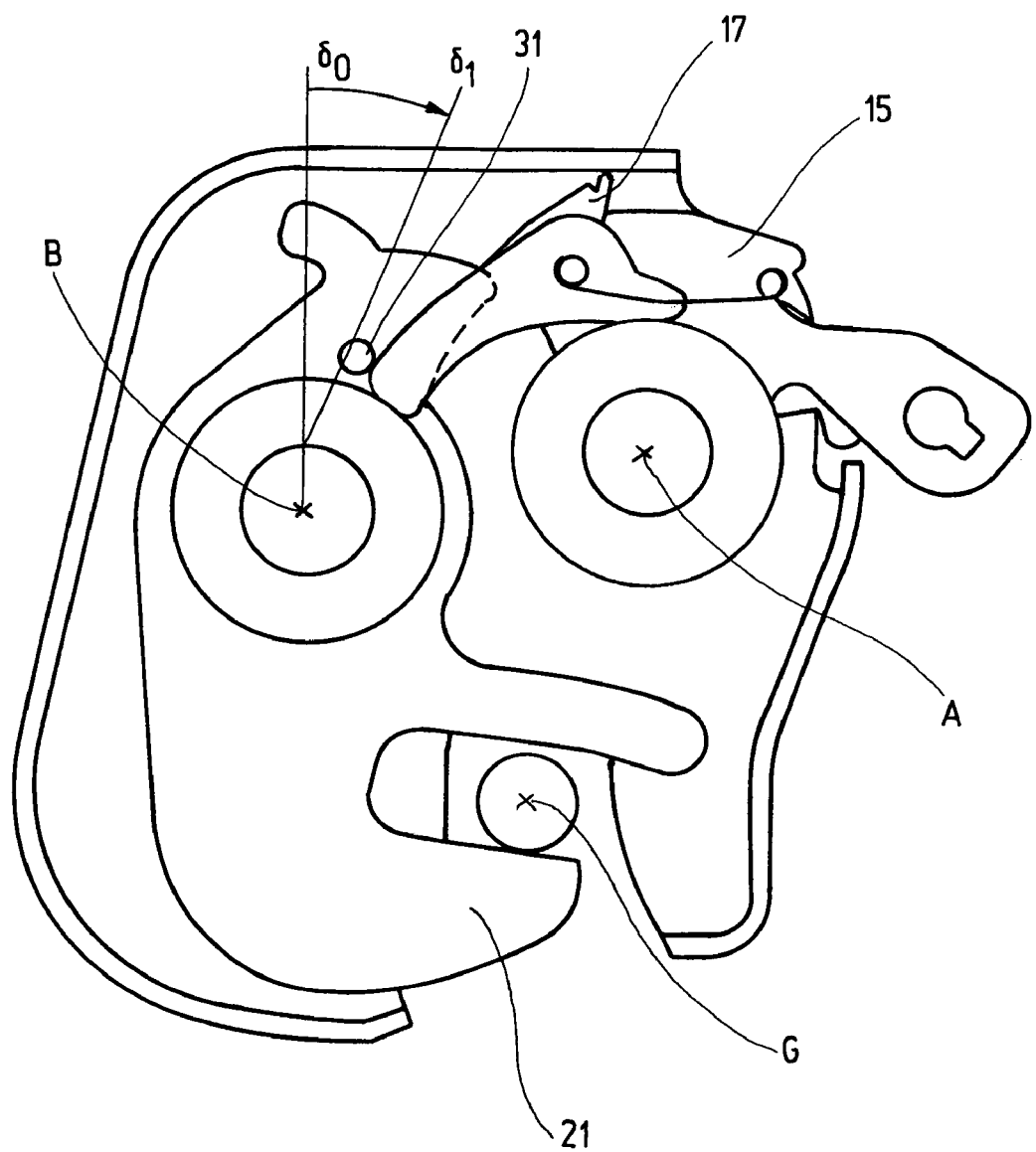
FIG. 4 shows a corresponding view with the block contacting.
Figure 5:
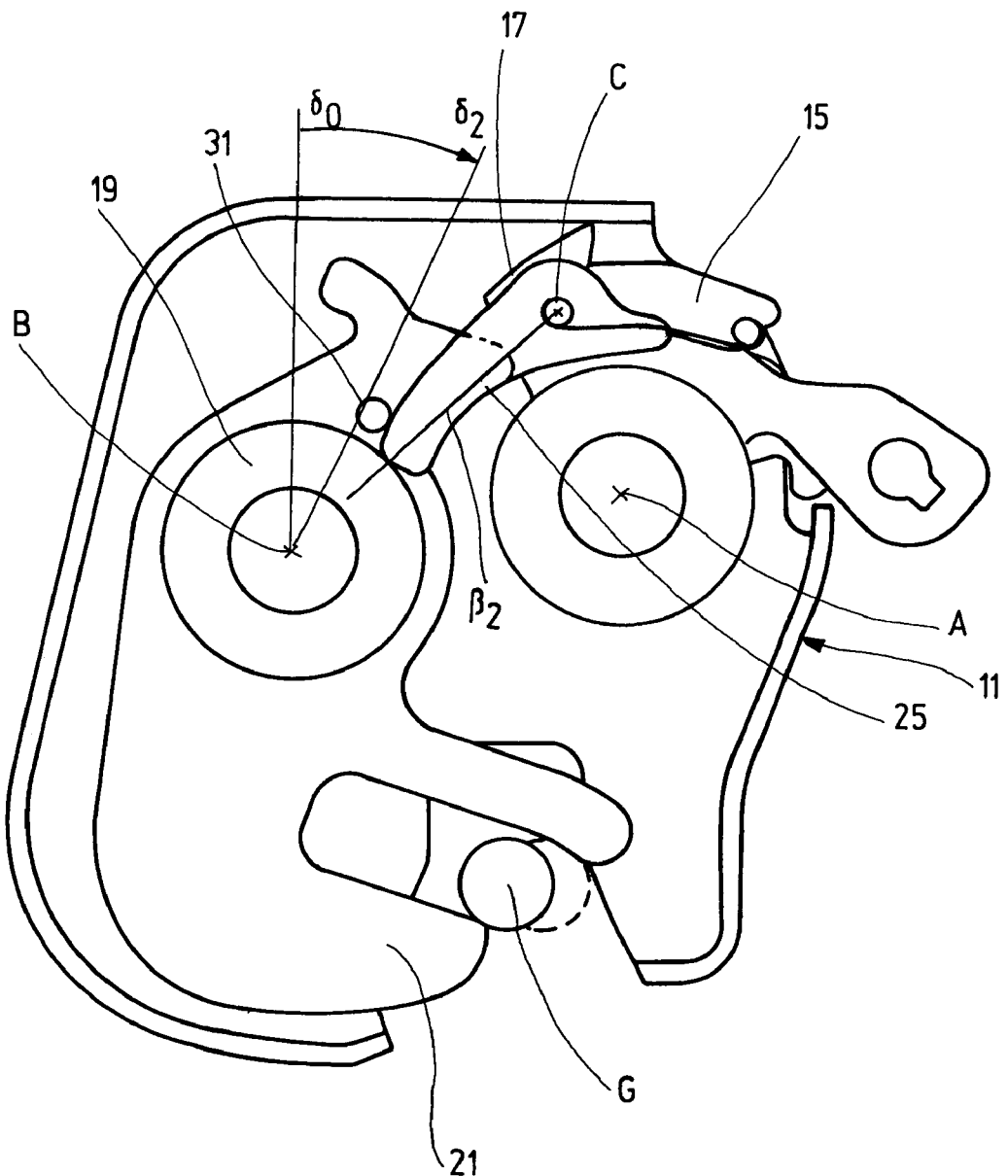
FIG. 5 shows a corresponding view when the block is being opened.
Figure 6:
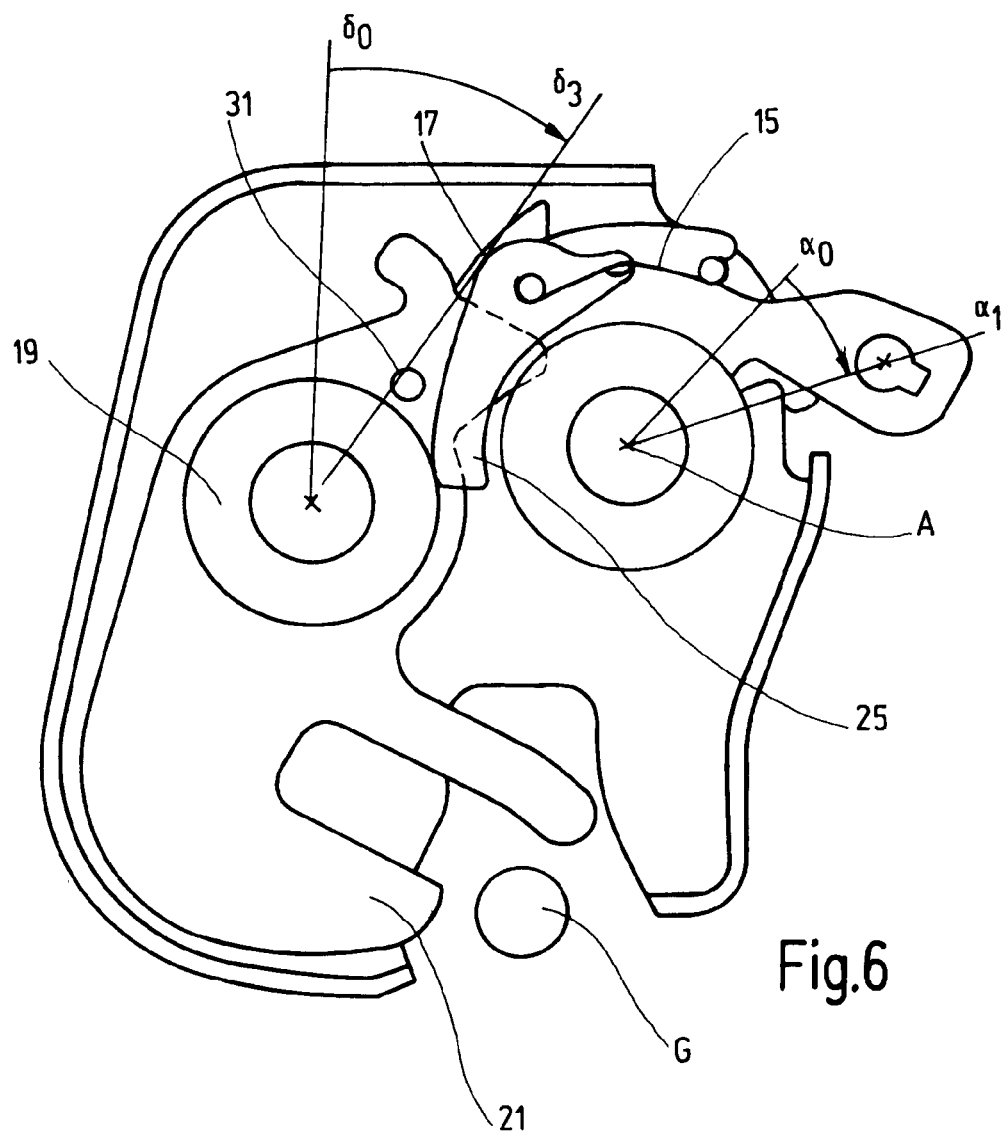
FIG. 6 shows a corresponding view with the block deactivated and the mating element unblocked.
Figure 7:
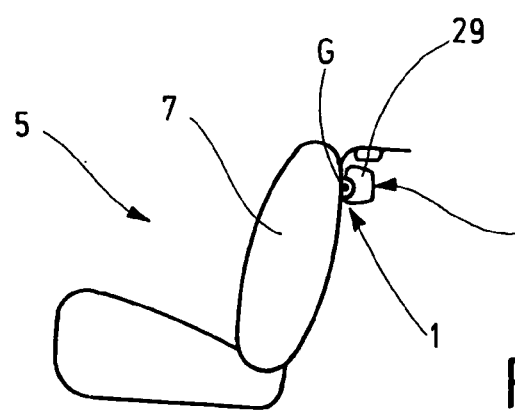
FIG. 7 shows a schematic side view of a vehicle seat.

A locking device 1 is provided for a lock 3. In the case of a vehicle seat 5 of a motor vehicle, more specifically of a rear seat arrangement, the backrest 7 is detachably locked to the vehicle structure of the motor vehicle with the lock 3, so that the backrest 7 can be folded forward when the lock is unlocked. To this end, the lock 3 interacts with a mating element G, for example a bolt or bracket. The lock 3 can be provided on the vehicle structure and the mating element G can be provided on the backrest 7, or the lock 3 can be provided on the backrest 7 and the mating element G can be provided on the vehicle structure.

A catch piece 15 and a loading cam 17 are pivotably mounted within a housing 11 of the lock 3 on a first bearing bolt 13 which defines a first pivot axis A. A pawl 21 is pivotably mounted on a second bearing bolt 19 which defines a second pivot axis B. The two pivot axes A and B are parallel to one another. The catch piece 15 and the loading cam 17 form securing elements of the locking device 1. The pawl 21 and the mating element G form the locking elements of the locking device 1. The loading cam 17 lies, in the locked position of the locking device under normal circumstances, on the pawl 21 under spring loading in a manner known per se, so that the pawl 21 remains engaged on the mating element G. In the event of a crash, the likewise preloaded catch piece 15 is supported flatly on the pawl 21, so that the pawl 21 does not open.

A blocking element 25 is pivotably mounted on a bearing pin 23 that defines a third pivot axis C. The bearing pin 23 can be formed from the same piece of material as the catch piece 15, or the bearing pin 23 can be mounted to the catch piece 15. The blocking element 25 is coupled to the catch piece 15 and preloaded against the second bearing bolt 19 by means of a spring 27.

For opening the locking device 1, starting from the locked state, the catch piece 15 is pivoted away from the pawl 21 about the first pivot axis A starting from an initial angle $\alpha_0=0°$. This pivoting of the catch piece 15 is clockwise in the drawing, and is by way of an unlocking handle 29. The catch piece 15 carries along the loading cam 17. The pawl 21 can in principle pivot while the angle $\alpha_1$ is equal to 36° or greater. The catch piece 15 and the loading cam 17 can pivot further, namely to an angle $\alpha_3$, at which the pivoting movement is delimited by an end stop which is not illustrated in the drawings.

At an angle $\alpha_2$ between $\alpha_1$ and $\alpha_3$ (approx. 39° to 42°), the catch piece 15 has taken along the bearing pin 23 so far that the blocking element 25, which has up to now rested against the second bearing bolt 19, can pivot up fully, specifically through an angle $\beta_1$, under the preload of the spring 27. If the unlocking handle 29 is now released, the catch piece 15 cannot pivot back because of the flat, almost radial support of the blocking element 25 on the second bearing bolt 19, i.e. the pawl 21 remains unlocked and the block of the catch piece 15 is activated.

The pawl 21 can now pivot up (open) starting from an angle $\delta_0$, driven, for example, by a relative movement of the mating element G. A driver 31 is formed on the pawl 21. At an opening angle $\delta_1$ (approx. 10°) of the pawl 21, the driver 31 comes into contact with the blocking element 25 and carries the blocking element it along. The further pivoting movement of the pawl 21 causes the support of the blocking element 25 on the second bearing bolt 19 to be continuously reduced, so that, at an angle $\beta_2$ and $\delta_2$ (approx. 21°), respectively, the torque of the loading cam 17 and of the catch piece 15 is greater than the self-locking force of the blocking element 25 on the second bearing bolt 19. The catch piece 15 and the loading cam 17 thereupon pivot back to the angle $\alpha_1$; however the catch piece 15 and the loading cam 17 bear against the upper end of the pawl 21, without obstructing or reversing the further pivoting movement of the pawl 21. The block of the now unblocked catch piece 15 is deactivated. The mating element G can, in its outermost position, leave the pawl 21 in this configuration.

The pawl 21 pivots further up to the angle $\delta_3$ (approx. 30°) which is defined by a stop on the housing 11. The locking device 1 is unlocked. The mating element G leaves the pawl 21. A spring, which is not illustrated, between the pawl 21 and the catch piece 15 holds the pawl 21 open. If the mating element G re-enters the mouth of the pawl 21, the pawl 21 pivots back to $\delta_0$. The catch piece 15 and the loading cam 17 pivot from $\alpha_1$ back to $\alpha_0$. The friction between the blocking element and the second bearing bolt 19 is in this case negligible.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A locking device for a vehicle seat, with the locking device comprising:
    locking elements that are cooperative for
       (a) interacting with one another to lock the locking device, and
       (b) at least one of the locking elements being moved away from another of the locking elements to unlock the locking device;
    at least one securing element that is mounted for being moved at least between a first position and a second position, wherein the securing element moves away from the at least one of the locking elements while the securing element is moved from the first position to the second position, and the securing element is operative for
       (a) restricting the at least one of the locking elements from being moved away from the another of the locking elements, to thereby restrict unlocking of the locking device, while the at least one securing element is in the first position, and
       (b) allowing the at least one of the locking elements to be moved away from the another of the locking elements, to thereby enable unlocking of the locking device, while the at least one securing element is in the second position; and
    a blocking element that is operative for restricting movement of the securing element from the second position to the first position so long as the at least one of the locking elements has not been moved away from the another of the locking elements.

2. The locking device according to claim 1, wherein the securing element being mounted for being moved at least between the first position and the second position comprises:
    the securing element being pivotably mounted on a bearing bolt for
       (a) being pivoted through a first angle from the first position to the second position, and
       (b) being pivoted to at least a second angle that is beyond the first angle.

3. The locking device according to claim 2, wherein:
    the bearing bolt is a first bearing bolt;

the locking elements includes a pawl that is pivotably mounted on a second bearing bolt, and the blocking element is supported on the second bearing bolt while the blocking element is restricting movement of the securing element from the second position to the first position;

the blocking element slides along the second bearing bolt while the securing element is pivoted; and the blocking element is supported flatly on the second bearing bolt while the securing element is at the second angle.

4. The locking device according to one of claim 3, wherein the pawl carries along the blocking element while the pawl is opening.

5. The locking device according to claim 4, wherein at a predetermined pivot angle of the pawl, the blocking element no longer restricts movement of the securing element as a result of a preload of the securing element being greater than a self-locking force of the blocking element on the second bearing bolt.

6. The locking device according to claim 5, wherein at the predetermined pivot angle of the pawl, the securing element pivots back to the first angle and rests against the pawl.

7. The locking device according to claim 2, wherein the blocking element is pivotably mounted on the securing element.

8. The locking device according to claim 2, wherein:
the bearing bolt is a first bearing bolt,
the at least one of the locking elements comprises a pawl that is pivotably mounted on a second bearing bolt, and
the another of the locking elements comprises a mating element.

9. The locking device according to claim 1, wherein the blocking element is pivotably mounted on the securing element.

10. The locking device according to claim 9, wherein:
the at least one of the locking elements comprises a pawl that is pivotably mounted on a bearing bolt, and
the another of the locking elements comprises a mating element.

11. The locking device according to claim 1, wherein the locking elements comprise:
a pawl that is pivotably mounted on a bearing bolt, and
a mating element.

12. The locking device according to claim 11, wherein the blocking element is supported on the bearing bolt while the blocking element is restricting movement of the securing element from the second position to the first position.

13. The locking device according to claim 12, wherein the pawl carries along the blocking element while the pawl is opening.

14. The locking device according to claim 11, wherein the pawl carries along the blocking element while the pawl is opening.

15. The locking device according to claim 1 in combination with the vehicle seat, wherein the vehicle seat includes a pivotable backrest, and the locking device is for locking the backrest to structure of a vehicle.

16. A locking device for a vehicle seat, with the locking device comprising:
a pawl mounted for pivoting between
(a) a closed position, wherein the locking device is locked while the pawl is in the closed position, and
(b) an opened position, wherein the locking device is unlocked while the pawl is in the opened position;
at least one securing element that is mounted for being moved at least between a first position and a second position, wherein the securing element moves away from the pawl while the securing element is moved from the first position to the second position, and the securing element is operative for
(a) restricting the pawl from pivoting to the opened position while the at least one securing element is in the first position, and
(b) allowing the pawl to be pivoted to the opened position while the at least one securing element is in the second position; and
a blocking element that is operative for restricting movement of the securing element from the second position to the first position so long as the pawl has not been pivoted to the opened position.

17. The locking device according to claim 16, wherein the blocking element is pivotably mounted on the securing element.

18. The locking device according to claim 16, wherein the securing element being mounted for being moved at least between the first position and the second position comprises:
the securing element being pivotably mounted on a bearing bolt for
(a) being pivoted through a first angle from the first position to the second position, and
(b) being pivoted to at least a second angle that is beyond the first angle.

19. The locking device according to claim 18, wherein:
the bearing bolt is a first bearing bolt,
the pawl is pivotably mounted on a second bearing bolt, and
the blocking element is supported on the second bearing bolt while the blocking element is restricting movement of the securing element from the second position to the first position.

20. The locking device according to claim 19, wherein:
the blocking element slides along the second bearing bolt while the securing element is pivoted; and
the blocking element is supported flatly on the second bearing bolt while the securing element is at the second angle.

* * * * *